US 9,961,306 B1

United States Patent
Lev et al.

(10) Patent No.: US 9,961,306 B1
(45) Date of Patent: May 1, 2018

(54) SMART HOLDER

(71) Applicants: Yaron Lev, Omer (IL); David Ben Shitrit, Rishon LeZion (IL)

(72) Inventors: Yaron Lev, Omer (IL); David Ben Shitrit, Rishon LeZion (IL)

(*) Notice: Subject to any disclaimer, the term of this patent is extended or adjusted under 35 U.S.C. 154(b) by 0 days. days.

(21) Appl. No.: 15/600,810

(22) Filed: May 22, 2017

(51) Int. Cl.
*G06F 1/16* (2006.01)
*H04N 7/18* (2006.01)
*B60R 11/02* (2006.01)
*B60R 11/04* (2006.01)
*H04R 1/02* (2006.01)
*H04R 3/00* (2006.01)
*H04R 1/10* (2006.01)
*G03B 17/56* (2006.01)
*H04N 5/247* (2006.01)
*H04B 1/3822* (2015.01)
*B60R 11/00* (2006.01)

(52) U.S. Cl.
CPC ......... *H04N 7/181* (2013.01); *B60R 11/0217* (2013.01); *B60R 11/0241* (2013.01); *B60R 11/0247* (2013.01); *B60R 11/04* (2013.01); *G03B 17/561* (2013.01); *H04B 1/3822* (2013.01); *H04N 5/247* (2013.01); *H04R 1/028* (2013.01); *H04R 1/1016* (2013.01); *H04R 1/1025* (2013.01); *H04R 3/00* (2013.01); *B60R 2011/0003* (2013.01); *B60R 2011/0056* (2013.01); *B60R 2011/0071* (2013.01); *H04R 2420/07* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 5,839,919 | A * | 11/1998 | Chen .................. | B60R 11/0217 379/446 |
| 6,138,041 | A * | 10/2000 | Yahia .................. | B60R 11/0241 379/445 |
| 6,687,513 | B1 * | 2/2004 | Hsu Li ................ | B60R 11/0241 379/420.04 |
| 7,068,783 | B2 * | 6/2006 | Peiker ................ | B60R 11/0241 379/446 |
| 7,515,709 | B2 * | 4/2009 | Richter ............... | B60R 11/0217 379/446 |
| 7,991,935 | B2 * | 8/2011 | Ho ....................... | G08C 17/02 340/12.54 |
| 8,478,357 | B1 * | 7/2013 | Harrington ......... | H04M 1/0254 455/569.1 |
| 9,031,624 | B2 * | 5/2015 | Ignomirello ....... | G02B 27/0101 455/575.9 |
| 9,450,632 | B1 * | 9/2016 | McElroy ............. | H04B 1/3877 |

(Continued)

*Primary Examiner* — Anthony Q Edwards
(74) *Attorney, Agent, or Firm* — Mark M. Friedman

(57) ABSTRACT

An apparatus for a mobile device, the holder including: a support structure including a mounting apparatus, adapted for fixing the apparatus in place within an interior space, a coupling mechanism adapted for removeably coupling the mobile device to the support structure, and a control unit housing; a processor unit, housed in the housing; a wireless transceiver, operationally coupled to the processor unit and configured to communicate with the mobile device; and a speaker, operationally coupled to the processor unit and the wireless transceiver and configured to output audio data received from the mobile device by the wireless transceiver.

22 Claims, 5 Drawing Sheets

(56) References Cited

U.S. PATENT DOCUMENTS

| | | | | |
|---|---|---|---|---|
| 2002/0082058 A1* | 6/2002 | Baratono | ................ | B60R 1/12 |
| | | | | 455/569.2 |
| 2003/0169522 A1* | 9/2003 | Schofield | ................ | B60R 1/04 |
| | | | | 359/876 |
| 2009/0002491 A1* | 1/2009 | Haler | ................ | B60R 1/12 |
| | | | | 348/148 |
| 2009/0154078 A1* | 6/2009 | Richter | ................ | B60R 11/0217 |
| | | | | 361/679.01 |
| 2009/0294617 A1* | 12/2009 | Stacey | ................ | B60R 11/02 |
| | | | | 248/316.1 |
| 2010/0304795 A1* | 12/2010 | Laine | ................ | F16M 13/00 |
| | | | | 455/575.1 |
| 2011/0098087 A1* | 4/2011 | Tseng | ................ | G01C 21/265 |
| | | | | 455/557 |
| 2012/0292463 A1* | 11/2012 | Burns | ................ | F16M 11/041 |
| | | | | 248/125.8 |
| 2013/0016463 A1* | 1/2013 | Hiramoto | ................ | H01R 35/04 |
| | | | | 361/679.01 |
| 2013/0250141 A1* | 9/2013 | Nakamura | ................ | B60R 11/02 |
| | | | | 348/231.7 |
| 2016/0259374 A1* | 9/2016 | Breiwa | ................ | H02J 50/10 |
| 2016/0282906 A1* | 9/2016 | Haga | ................ | G06F 1/1632 |
| 2016/0295089 A1* | 10/2016 | Farahani | ................ | G07C 5/008 |
| 2016/0360088 A1* | 12/2016 | Tanabiki | ................ | H04N 5/23206 |
| 2017/0006225 A1* | 1/2017 | Fu | ................ | H04N 5/23245 |
| 2017/0195638 A1* | 7/2017 | Schofield | ................ | H04N 7/183 |

* cited by examiner

SMART HOLDER

FIELD OF THE INVENTION

The present invention relates to a holder for a mobile communications device and, more particularly, to a holder for use in a vehicle where the holder has integrated computing functionality.

BACKGROUND OF THE INVENTION

Cell phones are possibly the most ubiquitous digital device found today in western society, and most definitely in urban areas. The modern landscape is filled with vehicles of all sizes and shapes, starting with two wheels, four wheels and more. The nexus between cellphones and vehicles has become a daily hazard. To cope with this hazard, a plethora of apparatuses for holding and positioning cellphones in vehicles have found their way to the marketplace. In parallel, a plethora of "hands-free" systems and device have also found their way to the marketplace.

"Hands-free" system allow drivers to communicate using their cellphones, but without the distraction of dealing with the cellphone itself, while driving. Cellphone holders, however, add no electronic functionality and are merely mechanical props and stands to give a driver a useful place to put the cellphone while driving.

SUMMARY OF THE INVENTION

The present invention provides a cellphone holder which is "smart", that is to say that the holder, besides for having mechanical functionality also has electronic functionality, such as, in a simple exemplary embodiment, "hands-free" communications functionality. The single device obviates the need for two separate devices: a holder and a hands-free system.

According to the present invention there is provided an apparatus for a mobile device, the holder including: a support structure including a mounting apparatus, adapted for fixing the apparatus in place within an interior space, a coupling mechanism adapted for removeably coupling the mobile device to the support structure, and a control unit housing; a processor unit, housed in the housing; a wireless transceiver, operationally coupled to the processor unit and configured to communicate with the mobile device; and a speaker, operationally coupled to the processor unit and the wireless transceiver and configured to output audio data received from the mobile device by the wireless transceiver.

According to further features in preferred embodiments of the invention the apparatus further includes a microphone, operationally coupled to the processor unit; and a storage medium, the storage medium operationally coupled to the microphone, the processor configured to record and store as audio data, on the storage medium, audio input sensed by the microphone.

According to still further features in the described preferred embodiments the apparatus further includes a forward-looking camera, the forward-looking camera operationally coupled to the support structure and electronically coupled to the processor unit; the forward-looking camera adapted to be positioned so as to have a field of view through a windshield of a vehicle; a storage medium, the storage medium operationally coupled to the forward-looking camera, the processor unit configured to record and store as visual data, on the storage medium, visual input sensed by the forward-looking camera.

According to still further features the apparatus includes a first interior-looking camera operationally coupled to the support structure and electronically coupled to the processor unit; the first interior-looking camera adapted to be positioned so as to have a field of view of at least a portion of the interior space of the vehicle, when fixed in place in the interior space; and a storage medium, operationally coupled to the first interior-looking camera, the processor configured to record and store visual input sensed by the first interior-looking camera on the storage medium.

According to still further features the apparatus further includes a second interior-looking camera operationally coupled to the support structure and electronically coupled to the processor unit; the second interior-looking camera adapted to be positioned so as to have a field of view of a second portion of the interior space of the vehicle, when fixed in place in the interior space; and wherein the processor is configured to record and store visual input sensed by the second interior-looking camera on the storage medium.

According to still further features the apparatus further includes an earpiece; and an earpiece receptacle, operationally coupled to the support structure and configured to hold the earpiece.

According to still further features the earpiece receptacle further includes a power port and the earpiece is adapted to receive power via the power port.

According to still further features the earpiece is capable of wireless communication. According to still further features the earpiece is operationally coupled to the apparatus via a wired electrical connector.

According to still further features the apparatus further includes at least one of: a Subscriber Identity Module (SIM) slot, a mini-SIM slot, a memory card slot. According to still further features the apparatus includes a wireless network transceiver operationally coupled to the processor unit, wherein the processor unit is configured to connect the wireless network transceiver to a SIM card inserted in the SIM slot or the mini-SIM slot so as to effect wireless transmission of audio, visual or audio-visual data over a cellular network or a satellite network.

According to still further features the processing unit is configured to effect wireless transmission of audio, visual or audio-visual data from the storage medium to the mobile device.

According to another embodiment there is provided an apparatus for a mobile device, the apparatus including: a support structure including a mounting apparatus, adapted for fixing the apparatus in place within an interior space of a vehicle, a coupling mechanism adapted for removeably coupling the mobile device to the support structure, and a control unit housing; a processor unit; a wireless transceiver, operationally coupled to the processor unit and configured to communicate with the mobile device; a forward-looking camera, the forward-looking camera operationally coupled to the support structure and electronically coupled to the processor unit; the forward-looking camera adapted to be positioned so as to have a field of view through a windshield of the vehicle; and a storage medium, the storage medium operationally coupled to the forward-looking camera, the processor unit configured to record and store on the storage medium visual input sensed by the forward-looking camera as visual data.

According to still further features the processing unit is configured to effect wireless transmission of the visual data from the storage medium to the mobile device.

According to another embodiment there is provided an apparatus for a mobile device, the apparatus including: a support structure including a mounting apparatus, adapted for fixing the apparatus in place within an interior space, a coupling mechanism adapted for removeably coupling the mobile device to the support structure, and a control unit housing; a processor unit; a wireless transceiver, operationally coupled to the processor unit and configured to communicate with the mobile device; a first interior-looking camera operationally coupled to the support structure and electronically coupled to the processor unit; the first interior-looking camera adapted to be positioned so as to have a field of view of at least a portion of the interior space, when fixed in place in the interior space; and a storage medium, operationally coupled to the first interior-looking camera, the processor configured to record and store visual input sensed by the first interior-looking camera on the storage medium.

According to another embodiment there is provided an apparatus for a mobile device, the apparatus including: a support structure including a mounting apparatus, adapted for fixing the apparatus in place within an interior space, a coupling mechanism adapted for removeably coupling the mobile device to the support structure, and a control unit housing; a processor unit; at least one media sensor operationally coupled to the support structure and electronically coupled to the processor unit, the at least one media sensor configured to activate upon sensing motion within a field of view or noise above a predefined volume threshold of the at least one media sensor, and a storage medium, operationally coupled to the at least one media sensor, the processor configured to record and store visual, audio or audiovisual input, sensed by the at least one media sensor, on the storage medium.

According to still further features the apparatus further includes a long-range, wireless network transceiver operationally couple to the processor unit, wherein the processor unit is configured to connect the wireless network transceiver to a SIM card so as to effect wireless transmission of the stored audio, visual or audiovisual input over a cellular network or a satellite network.

According to still further features the at least one media sensor is selected from the group including: an image detector, a video camera, a microphone, a combination audiovisual sensor.

According to still further features the at least one media sensor includes a plurality of media sensors.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
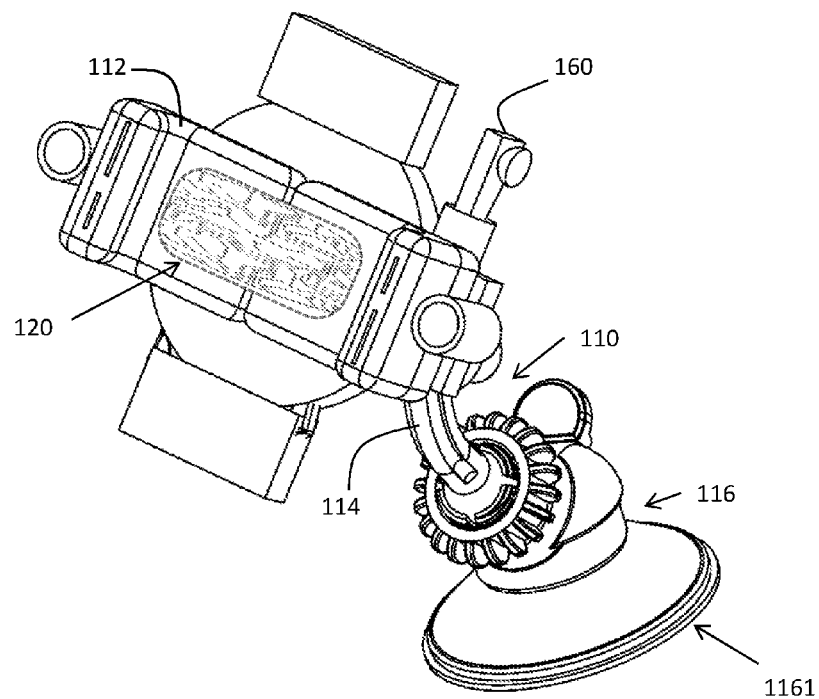
FIG. 1 is a front isometric view of one preferred embodiment of the mobile device holder/multipurpose apparatus.

The principles and operation of a smart holder according to the present invention may be better understood with reference to the drawings and the accompanying description. The following detailed description is provided by way of example and not intended to limit the scope of the invention in any way. Specific details in the described embodiments and exemplary apparatuses are set forth in order to provide a thorough understanding of the embodiments and the exemplary apparatuses. It should be apparent, however, that not all details are required in all embodiments of the invention.

One of the unique qualities of the smart holder/apparatus of the immediate invention is the ease in which the apparatus can be installed in a vehicle (or elsewhere). While the preferred embodiments closely resemble—at least in part—known hands-free mobile device holders used in cars, it is made clear that the scope of the invention is not limited to implementation within a vehicle. Rather, any surface upon which the apparatus can be mounted, installed or permanently or temporarily fixed in place is included within the scope of the invention. One non-limiting example is temporary installation of the apparatus on a desktop in an office. The device can serve as a surveillance apparatus and/or a recording apparatus (e.g. for use in an interrogation room).

The term "installed" in intended herein to include all forms of affixing an object in place. The term includes both permanent fixture and well as temporary fixture. Permanent fixture is distinguished from temporary fixture not necessarily by actual duration in which the object is fixed in the same place, but rather the means for installing the object. Such a distinction is intuitively understood, but some examples are provided in an attempt to clarify the distinction. For example an object fixed in place with adhesive that undergoes a hardening or curing process, screws, nails and the like (whether puncturing the surface or merely passing through prepared apertures) would be considered, at least within the scope of the present invention, as being permanently fixed in place. Conversely, a suction-based arrangement such as a cup vacuum-adhered to a surface, a magnetic coupling, a pressure fixture (e.g. a vice), a non-hardening adhesive material, reusable putty-like pressure-sensitive adhesive (also non-hardening) (e.g. Blu-Tack™) and other bonding methods and materials that, in general, do not need tools or excessive force to remove, and are usually reusable, are defined herein as being temporary with regards to installation/fixing in place.

The ease of installation, for example, temporary installation, is one of the unique features of the present invention. The present innovative apparatus is not installed or connected to the onboard wiring of the vehicle. No specialized installation is required. Another unique feature is that the peripherally integrated components are not peripherally dispersed within the vehicle (or other internal space) but rather integrated into a single apparatus. Yet another unique feature of the innovative apparatus is that the device is self-contained. All the components are part of the apparatus not the vehicle (or other space). E.g. the hands-free feature does not use the car's stereo system, but rather an integrated speaker.

Referring now to the drawings, FIGS. 1 to 7 illustrate various views of a most preferred embodiment of a smart holder of the present invention. The depicted embodiment of the present invention is only one preferred embodiment, and it is clarified that one or more of the depicted components may be missing in other embodiments of the invention.

Figure 2:
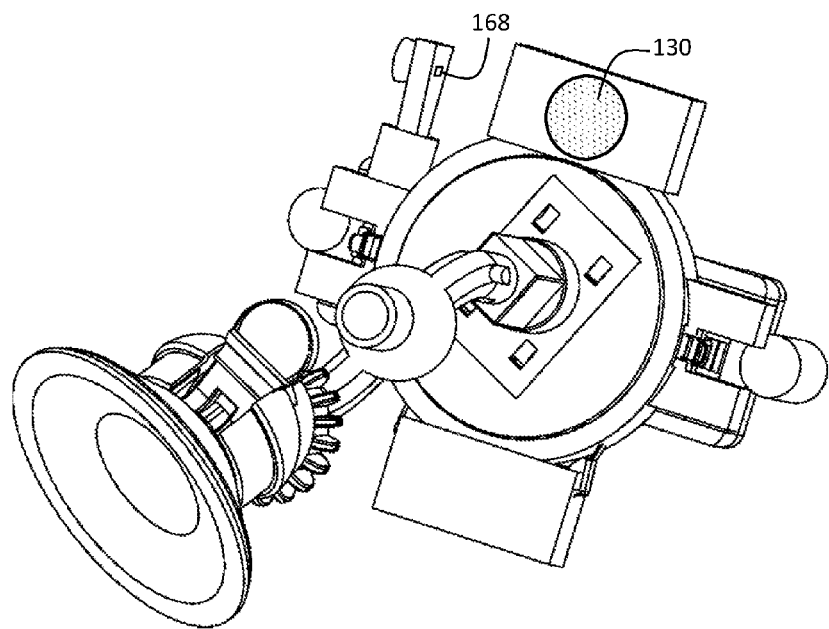
FIG. 2 is a back isometric view of the innovative apparatus.
Figure 3:
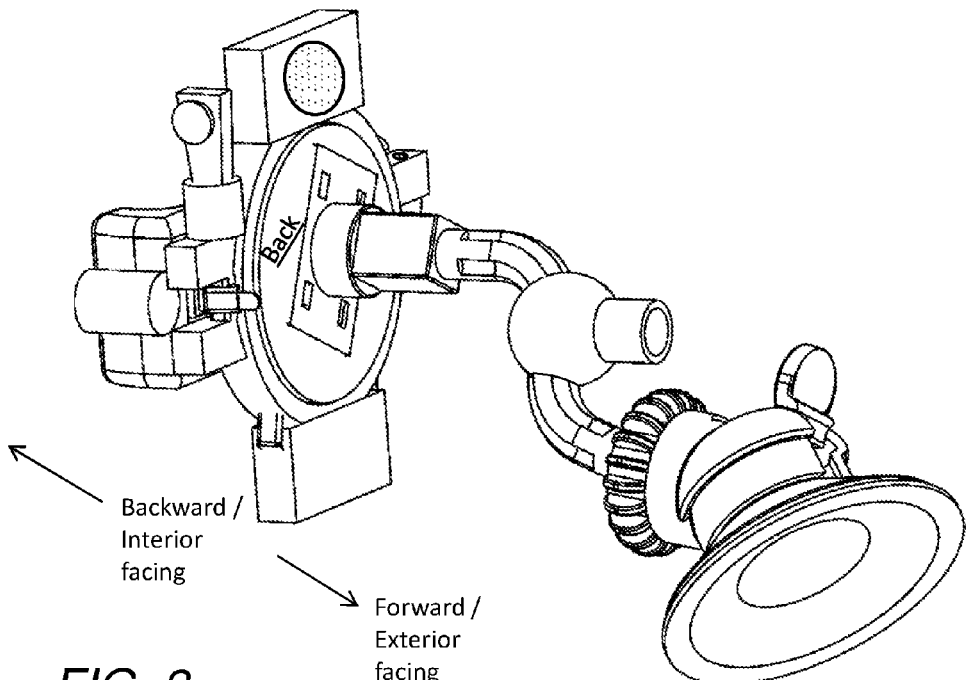
FIG. 3 is a rear, side view of the apparatus.
Figure 4:
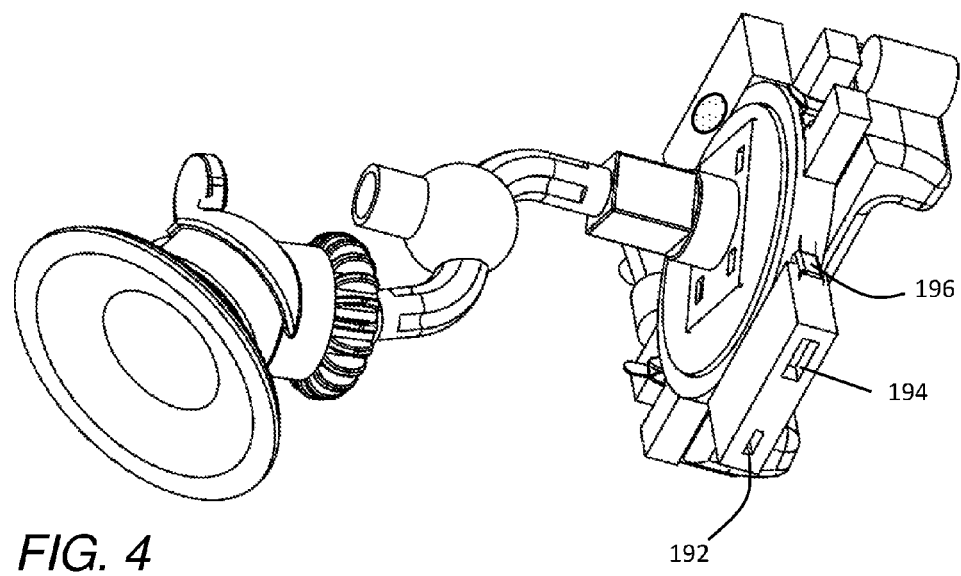
FIG. 4 is a bottom rear view of the apparatus.
Figure 5:
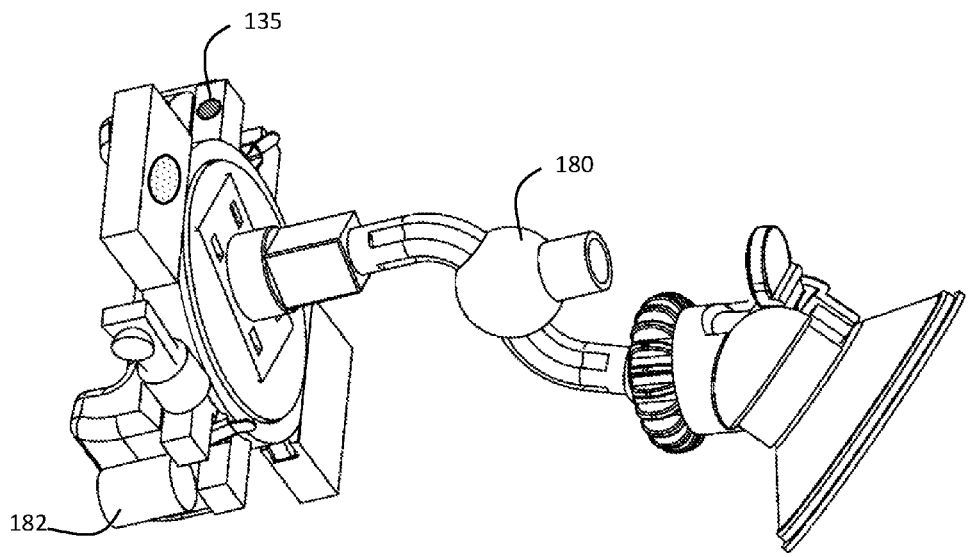
FIG. 5 is a top rear view of the apparatus.
Figure 6:
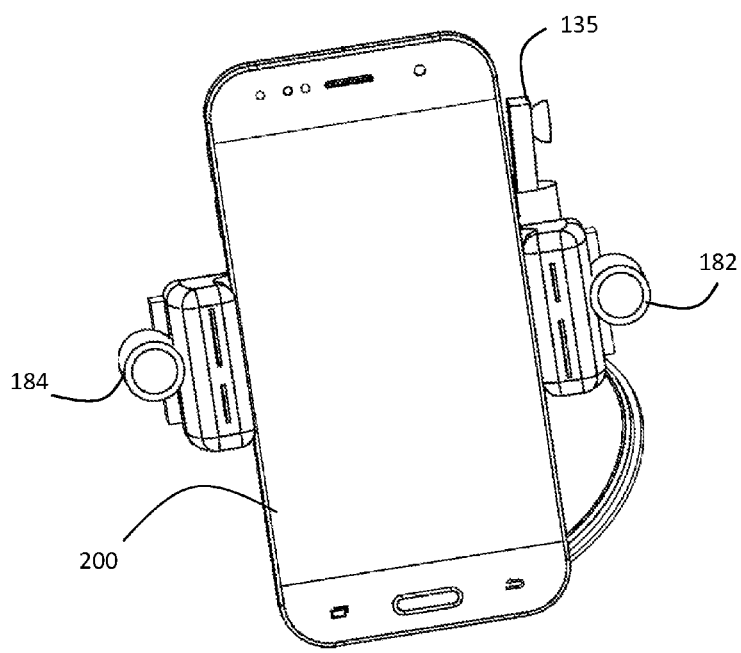
FIG. 6 is a front view of the apparatus with an exemplary mobile device in place in the apparatus.
Figure 7:
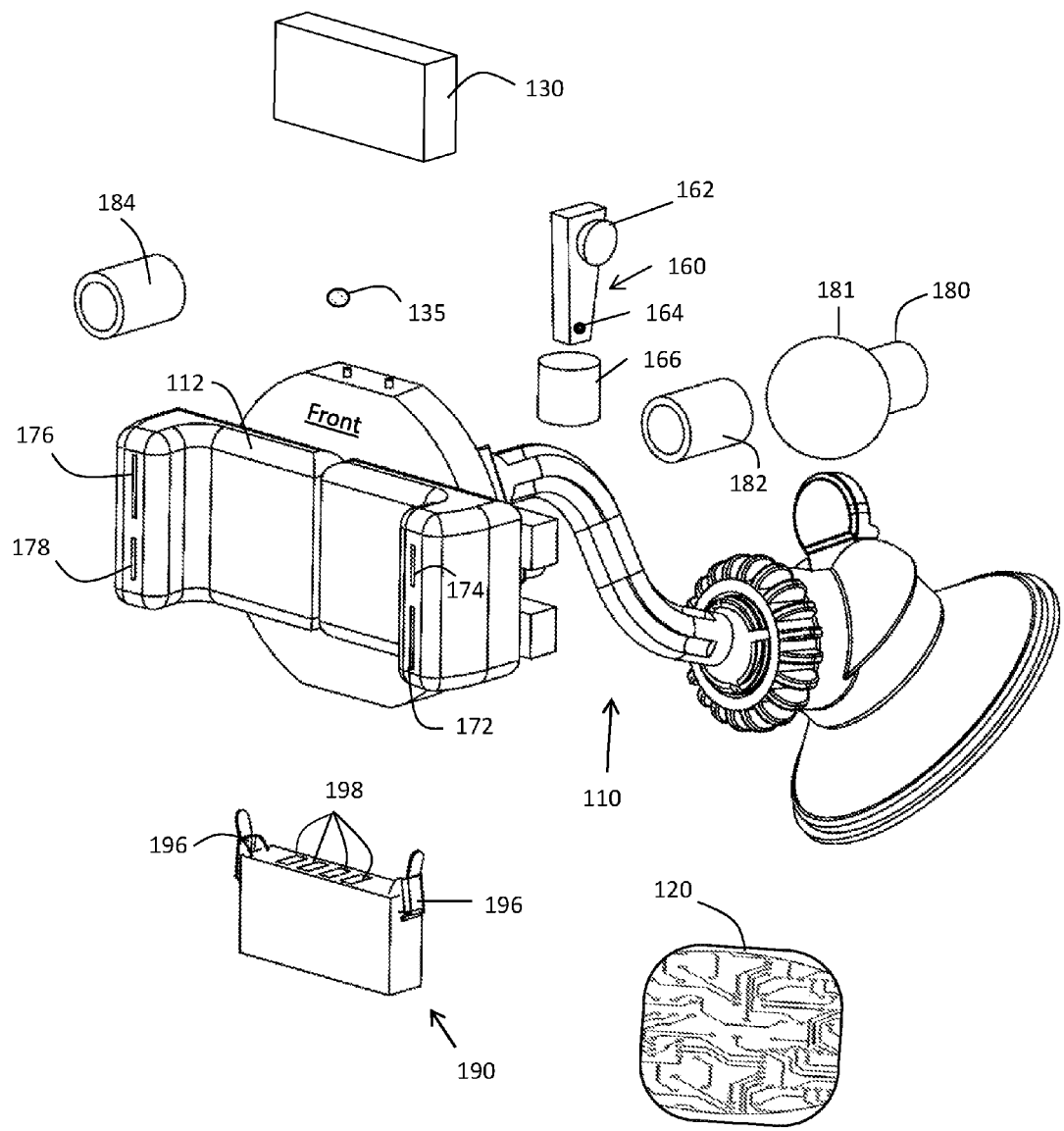
FIG. 7 is an exploded view of the innovative apparatus.

FIG. 1 is a front isometric view of one preferred embodiment of the mobile device holder/apparatus 100. FIG. 2 is a back isometric view of the mobile device holder/apparatus 100. FIG. 3 is a rear, side view of the apparatus. FIG. 4 is a bottom rear view of apparatus. FIG. 5 is a top rear view of apparatus 100. FIG. 6 is a front view of apparatus 100 with an exemplary mobile device (smartphone 200) in place in the apparatus. FIG. 7 is an exploded view of the innovative apparatus 100.

The present invention is a multipurpose mobile device holder 100 which has both mechanical components and electronic components that give multipurpose holder 100 added functionality beyond both known holders and hands-free devices. In all of the embodiments, the multipurpose holder 100 consists of a support structure 110 and a control unit 120. The exemplary embodiment depicted in FIGS. 1-7 includes a plurality of components, most of which are depicted as peripherals. It is made clear that this is a mere design choice and only one exemplarily configuration.

It is further made clear that while the figures include all of the components, some preferred embodiments only have some or even only one of the electronic components. Furthermore, while a number of different configurations are discussed below, it is understood that the invention is not limited to the exact configurations detailed below and variations, modifications and alternative combinations of the same or similar components assembled within the apparatus are included within the scope of the invention.

FIG. 6 includes an exemplary mobile device 200 held in apparatus 100. The term "mobile device" as used herein refers to any device configured to communicate with a wireless network, including, but not limited to a smartphone, tablet, mobile station, user equipment (UE), personal digital assistant, laptop, public safety Land Mobile Radio (LMR) terminals, e-Readers, dedicated terminals and any other device that enables mobile data communication.

Support structure 110 includes all the mechanical aspects of the mobile device holder/apparatus 100. The exemplarily support structure depicted in FIGS. 1-7 includes a holding bracket 112, a resiliently adjustable arm 114 and a base 116 for fixing the holder in place. A control unit housing 118 is affixed at the proximal end of the adjustable arm and the holding bracket is mounted on the housing 118.

The term "support structure" is not limited to the depicted adjustable arm, holding bracket and base but rather refers to any type of structure that adapted to hold a mobile device in a desired location or position within the interior space of a vehicle. Some commonly found support structures include, but are not limited to: dash-mounted stands, windshield mounted arms, air conditioner fin attachments, magnetic bases that mate with a metal plate fixed on the mobile device (or device jacket), holders with hanging arrangements that are hung from a rearview mirror and more.

Holding bracket 112 is merely one exemplary embodiment of a "coupling mechanism" of the innovative apparatus. A "coupling mechanism" is any mechanical (including electromechanical) arrangement that is adapted to hold the mobile device to, in or on the apparatus. Some alternative examples of mechanical arrangements that are included in, but not limited to, the scope of the component are: a magnetic arrangement whereby a magnet on the apparatus mates with a metal piece fixed to the back of the mobile device, a stand, a shelf, a suction cup, a receptacle, a plastic/elastic apparatus with movable arms for securing the mobile device to the apparatus, an adjustable holding bracket, a duel or multi-position holding bracket etc. Many other variations are known in the art and new designs and devices are constantly being produced and marketed. All of these devices are included within the scope of the term "coupling mechanism".

Adjustable arm 114 is merely one exemplary embodiment of an "adjustable and/or support component" that is generally interposed between the coupling mechanism that actually holds the mobile device and the base of the support structure which secures the apparatus in place. Some support structures do not include an adjustable support. In some structures, the support component is not adjustable. In some embodiments, the adjustable support component is only an adjustable component. The term adjustable is intended to mean movable, adapted to be repositioned, in some cases malleable, flexible, lending itself to manual manipulation to change a set state or configuration, rotatable about one, two or three axes.

The suction cup base depicted in the Figures is merely an exemplary embodiment of the "affixing base" or "mounting base" or simply "base" of the support structure. The base includes a mounting surface 1161 depicted herein as a suction cup arrangement for mounting the support structure on a flat surface such as a dashboard or windshield. Other types of bases include, but are not limited to: air conditioner fin attachments, hanging arrangements that are hung from a rearview mirror, metal brackets/arms mounted or fixed to or on a dashboard or the like.

Control unit housing 118 usually serves a dual function. One function is to serve as a mechanical feature such as a backing for the holder and/or a central housing component to which, or in which, some or all of the peripherally integrated components/devices are operationally coupled or housed. The second function is to house the electronic components which control the functioning of the apparatus and electronically tie or couple all the components and elements together. One or more printed circuit boards, wiring, circuitry, power conduits, and the like are generally housed in the control unit housing 118.

Control unit 120 is housed in housing 118. In the exemplary depicted embodiment, the control unit is depicted as embedded/embodied on a printed circuit board (PCB). Control unit 120 includes a processor unit, controllers, circuitry, and other internal components such as wireless communication antennas and transceivers, internal memory and all other components necessary for the function of the multipurpose holder, as will be further detailed below and with regards to FIG. 8.

Figure 8:
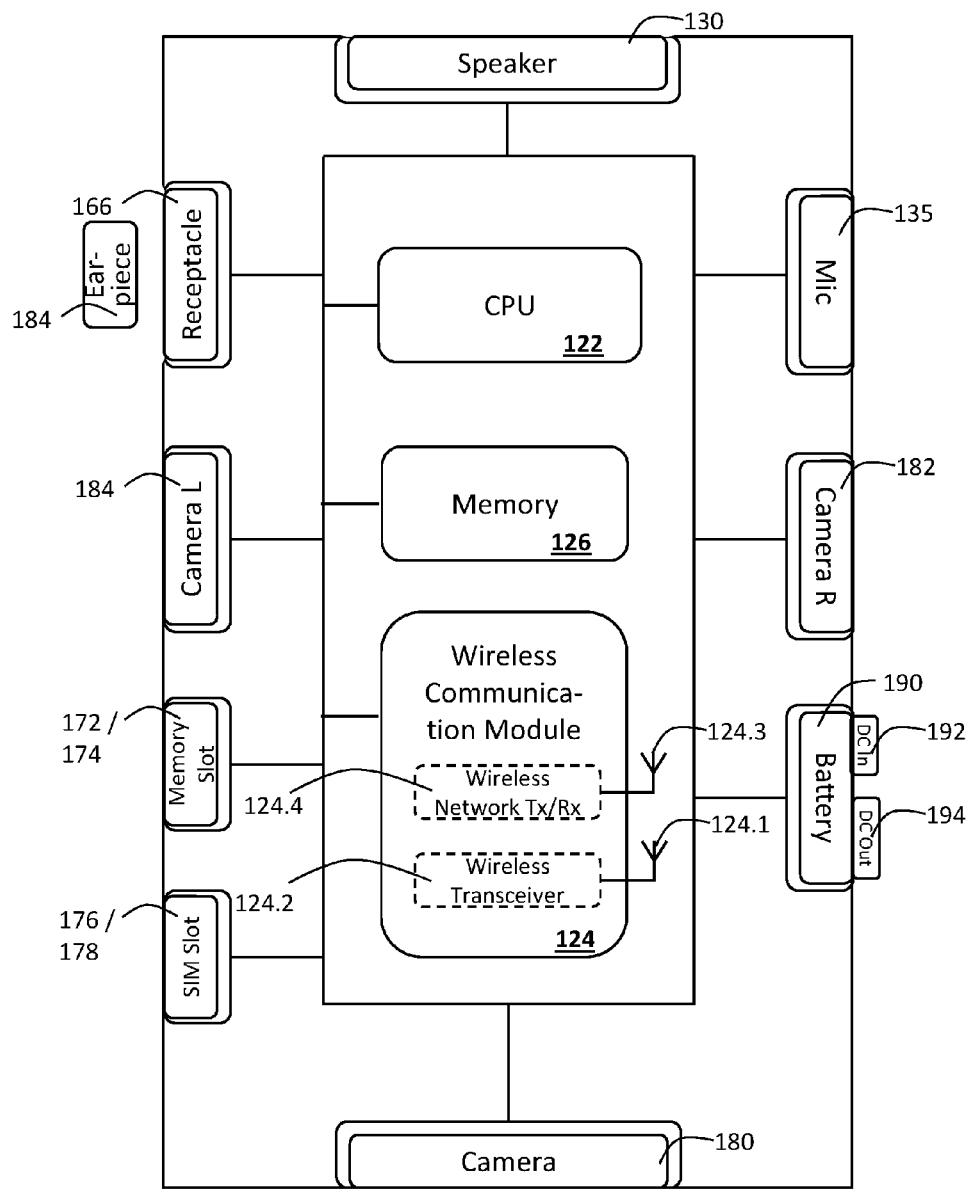
FIG. 8 is a schematic block diagram of control unit.

FIG. 8 illustrates a schematic block diagram of control unit 120. The exemplary control unit depicted in FIG. 8 includes a plurality of components, all of which are included in at least one preferred embodiment of the invention. However, it is made clear that several embodiments of the invention include only a portion of the depicted components. As such, depiction of the plurality of components is not intended to be limiting in any way, but rather serves to provide a single figure including components from many different embodiments. In discussions below, various embodiments pick and choose components from the numerous elements depicted in the Figure. One skilled in the art will appreciate that other variations, modifications, combinations and configurations are included within the scope of the invention, but are not detailed or listed specifically as configurations are too numerous to mention explicitly.

Conversely, only components that are germane to the discussion are depicted in the diagram. One skilled in the art will be aware of the necessary circuitry, electronic modules and additional components necessary for the proper function of the device as described herein. As such, and with an eye on brevity, some of these details have been omitted.

In one embodiment, control unit 120 includes a processing unit 122 and a wireless communications module 124. Components are discussed in further detail below. According to the present embodiment, the multipurpose apparatus/ mobile device holder 100 functions as both a mechanical holder for a mobile device as well as being capable of wirelessly communicating with a proximal mobile device. In most scenarios, the mobile device held in the holder is also the device which is in wireless communication with the holder.

The term "processor" as used herein refers to any physical device having an electric circuit that performs a logic operation on input or inputs. For example, processor unit 122 may include one or more integrated circuits, microchips, microcontrollers, microprocessors, all or part of a central processing unit (CPU), graphics processing unit (GPU), digital signal processor (DSP), field-programmable gate array (FPGA) or other circuits suitable for executing instructions or performing logic operations. Processor unit 122 may be configured to communicate with the mobile device and other electronic components (e.g., a transceiver) within the apparatus and to control at least one of the components of the apparatus. The instructions executed by processor unit 122 may be pre-loaded into a memory unit integrated with or embedded into processor unit 122, or stored in a separate memory unit (335) having an erasable and non-erasable memory banks, such as a RAM, a ROM, or a hard disk. In the alternative, the instructions executed by processor unit 122 may be received from mobile device 200, i.e., mobile device 200 or an application pre-installed on the mobile device can control the operation of the processor unit 122 by sending processor unit 122 instructions via a wireless transceiver or via electrical connector. Some of the logic operations processor unit 122 may be configured to preform are: local circuitry management, handshake with mobile device 200 over the wired and/or wireless links, a user authentication, data encryption/decryption, virtual SIMs implementation, battery charging control, battery status report (e.g. via an LED indicator [not shown]), power management, processing of connectivity detection. While, for ease of illustration, FIG. 8 illustrates a single processor, it should be understood that, consistent with embodiments of the invention, functionality may occur in a single processor or may be split among multiple processors.

Wireless communications module 124 includes are all the necessary and/or preferred components for receiving and transmitting wireless communication signals. Wireless communications module 124 includes at least one antenna 124.1 (e.g. a wireless communications antenna) and a wireless transceiver 124.2, operationally coupled to the wireless communications antenna 124.2.

The term "antenna" as used herein means any radiating element (or multiplicity of radiating elements) that is capable of receiving electromagnetic radiation and generating an electrical signal therefrom. For example, the term "antenna" includes an RF antenna, a multiple-input and multiple-output (MIMO) antenna, an antenna set, an antenna array, a beam forming antenna, a multi-frequency antenna, a multi-band antenna, or any RF device. In one embodiment the term "antenna" includes also at least one processing unit that supports the RF connectivity or physical layer connectivity required to establish wireless communication, e.g., cellular, satellite, WiFi, bluetooth etc.

The term "transceiver" as used herein refers to any device capable of transmitting and/or receiving signals. Mobile device 200 can communicate with multipurpose holder/apparatus 100 with any commercial standard wireless protocol, for example: Wireless Ethernet, WiFi, Bluetooth, Zigbee, WiGig, Wireless Personal Area Network, NFC. In some embodiments, the mobile device communicates with apparatus 100 with a wired protocol over a commercial standard connector, for example: USB, HDMI, mobile devices docking connectors, Apple Lightning connector, Apple External Accessory connector protocols such as MFi, Samsung Galaxi Tab connector. In some cases mobile device 200 can communicate with apparatus 100 using a commercial standard wireless protocol even when they are physically connected.

One exemplary type of functionality afforded by the present embodiment is a "hands-free" capability. Hands free devices/systems allow a user to communicate using the mobile device without having to hold the device in hand. The mobile device is electronically coupled to the multipurpose holder 100 via the wireless communications module 124. Preferably the holder includes a speaker 130 (either peripheral to the support structure or integrated therein) for amplifying the received audio signal. For example, when the mobile device is paired and connected with the holder, the audio signal from an incoming call is wirelessly transmitted to the holder and automatically broadcast over the speaker.

The most common form of wireless coupling and communication between handheld/mobile devices and [wireless] hands-free devices is over Bluetooth™. A digitized audio signal is transmitted from the Bluetooth transceiver in the mobile device to a corresponding Bluetooth module on the hands-free device. In preferred embodiments, the Bluetooth wireless protocol is used for wireless communications between the mobile device 200 and holder 100. In other embodiments, any applicable radio frequency (RF) protocol is used in place of, or in addition to, the Bluetooth protocol.

In some embodiments, apparatus 100 further includes a microphone that is operationally coupled to the processor unit. The microphone may be an embedded microphone such as microphone 135 (visible in FIGS. 3, 5 and 7). Preferably the micro phone is a highly sensitive microphone. In other embodiments, an additional or alternative microphone (not shown) is electronically coupled to the apparatus. The microphone may be coupled in a wired or wireless manner. For example, a wireless microphone may be clipped onto a sun visor or placed in another position proximal to the user's mouth. The microphone may be paired with apparatus 100 in any manner known in the art. One example of a wired coupling may be a microphone on a retractable cord. The microphone can exemplarily be housed in a receptacle (not shown) on the apparatus and when removed, the cord unreels from a spring-loaded spool. The microphone can be positioned on the user or is some other convenient location, as above. In a further alternative embodiment, a microphone 164 of earpiece 160 (which is discussed below in further detail) can be activated and used without activating the ear bud component 162.

In other embodiments, apparatus 100 (support structure, control unit (processing unit, wireless transceiver etc.) and speaker), further includes an embedded microphone 135 and a memory 126 (e.g. internal storage medium 126). In preferred embodiments, microphone 135, when active, records all audible sounds above a predefined threshold. Exemplarily, the predefined threshold is defined by the microphone's level of sensitivity. In one embodiment, the recorded matter is stored on storage medium 126.

In preferred embodiments, the stored audio matter is wireless transmitted to a second location/storage medium, at predefined intervals. In one preferred embodiment, the microphone is activated when a mobile device (e.g. smartphone 200) is electronically connected to apparatus 100. Preferably, recorded audio matter is wirelessly transmitted from storage medium 126 to the connected mobile device (e.g. smartphone 200) at the aforementioned predefined intervals. In other embodiments, audio matter sensed by microphone 135 is streamed to the mobile device and recorded there. In yet another embodiment, apparatus 100 includes at least one digital media slot 172 adapted to receive a removable memory card 173. In the presently discussed embodiment, the control unit 120 may or may not include internal storage medium 126. The recorded audio data may be stored may be stored on the removable storage medium and transferred to the mobile device at the aforementioned intervals. Alternatively, in the case of a sufficiently large removable storage medium, the intervals may be longer between each transmission. Further alternatively, the data may be stored on the removable storage medium until physically removed from the slot.

In other embodiments, the microphone is autonomic and automatically activates whenever sound/noise above the aforementioned volume threshold is detected. The audio recording function provides an audio record of conversations, words, sounds and noise in and near the vehicle in which the apparatus is installed (or wherever the apparatus is permanently or temporarily installed). As the microphone works within needing to be connected to the mobile device, it is necessary to store the data on a sufficiently large capacity storage medium. In one configuration the internal memory has sufficient capacity for storing all audio data until the mobile device is connected, at which point audio data is transmitted to the mobile device. In another configuration, a removable storage medium may replace or augment the storage capabilities of the internal memory.

In the aforementioned embodiments, the data is wirelessly transmitted to the mobile device. To facilitate the communication of data between the apparatus and the mobile device, it is necessary to install a software application on the mobile device. Software developers skilled in the art of producing mobile apps would be capable producing an app configured to communicate and cooperate with apparatus 100 to facilitate the data communication, as well as providing a competent graphic user interface for sending the necessary computer readable instructions to the processing unit of the apparatus, so as to effect each of the described functions detailed herein. As such, details of the computer-readable instructions necessary for both the functioning of the app as well as instructing the processing unit of the apparatus are not discussed in detail here.

Furthermore, the mobile app, in preferred embodiments, includes functionality for transmitting the stored audio data over a wireless network to a remote computing device for storage. The remote computing device may be a single server, a plurality of storage device such as a server farm, a cloud-based storage network and the like.

As discussed above, in some embodiments, the microphone is sound or voice activated, regardless of whether a mobile device is in close proximity or not. Methods for compensating for the lack of mobile device storage facility and/or the wireless network connectivity (for uploading the audio data, e.g. to the cloud storage) are discussed above. In some embodiments, the aforementioned challenge is obviated by further including a wireless network transceiver (sometimes referred to as a long-range transceiver) in the control unit. The network transceiver facilitates the wireless transmission of data from the apparatus, over a wireless network (e.g. cellular network, satellite network etc.) to a remote storage location. Alternatively, the data may be transmitted to a monitoring facility and/or a processing facility. For example, when there is no mobile device in the apparatus, such as during the night or when the vehicle is parked in a parking lot, detected sounds may be transmitted to a monitoring station. Exemplarily, the sounds may be run through noise filters or processed by audio processors to determine if a detected noise is indicative of the vehicle being broken into and/or stolen. The monitoring station may be alerted to the suspicious noise and a security or law enforcement entity may be alerted. Numerous other applications of the described technology are envisioned but not listed for the sake of brevity.

The term "wireless network transceiver" or "network transceiver" as used herein refers to any device capable of transmitting and/or receiving signals in a wireless network. For example, a network transceiver can communicate with a cellular network, mobile telephony network, IP network, and even with mesh devices or peer-to-peer devices. While the invention, in its broadest sense, is not limited to any particular transceiver or communications protocol, embodiments of the invention may employ a network transceiver that uses one or more of the following exemplary communication standards: GSM, GPRS, HSPA, Edge, LTE, LTE Advanced, HSPA, CDMA, CDMA Rev A, CDMA Rev B, WiMAX, COFDM, Wibro, Satellite BGAN, and satellite VSAT. Alternatively or additionally, a wireless transceiver employing WiFi or Bluetooth communication standards can transfer or transmit the stored data to router electronically coupled to a LAN (e.g. over an Ethernet connection). Alternatively, embodiments of the invention may involve transceivers that use other known or future wireless protocols.

In some embodiments, a separate wireless network antenna 124.3 is included in the wireless communications module 124. Network antenna 124.3 is electronically coupled to a wireless network transceiver 124.4. In order for the wireless network transceiver to function as described above the wireless network transceiver is operationally coupled to the processor unit (e.g. CPU 122). Processor unit 122 is configured to connect the [long-range] wireless network transceiver to a Subscriber Identity Module (SIM) or a mini-SIM card inserted in a SIM slot (e.g. slot 176) or a mini-SIM slot (e.g. slot 178) in order to in order to provide identification credentials read from the SIM in order to access the network. With the SIM subscriber identification credentials the network transceiver can effect wireless transmission of the audio data a cellular network or a satellite network.

In some embodiments, the multipurpose apparatus 100 further includes a camera (e.g. forward-facing camera 180). In one configuration, the camera is oriented so as to have a field of view (FOV) in a direction similar to the direction in which a user is facing. For increased clarity, the side of the apparatus that receives the mobile device is referred to as the front of the apparatus. In general use, and specifically when installed (permanently or temporarily) in a vehicle, the front of the apparatus faces the user. The coupling mechanism for holding the mobile device to the apparatus is generally located on the front of the multipurpose apparatus. The back of the apparatus faces away from the user. In the vehicle implementation, the back surface of the apparatus 100 faces the windscreen of the vehicle.

In preferred embodiments the front facing camera (also termed "exterior facing", "dashboard cam", "windshield facing") is affixed to the back side of the support structure (e.g. between the control unit housing and the windscreen) on an adjustable coupling mount 181. The forward facing camera may be mounted on any part of the structure and angled to face in the direction so as to have a FOV similar to that of the user. The camera is configured to activate, in one embodiment, when the mobile device is connected to the apparatus. The camera may be any camera known in the art. In some embodiments, the camera includes a built in memory. In other embodiments, the camera is operationally coupled to internal storage medium 126 as discussed above in relation to the microphone. Like with the audio data, the visual data captured by the forward looking camera may be stored on the internal storage medium 126. Alternatively, the visual data may be stored on the built in memory. In further alternative embodiments, the visual data may be stored on the removable storage medium. The visual data may be a plurality of still images, video, short video clips, high resolution images/video, low resolution images/video or any other visual/video format known in the art.

In some embodiments, the visual/video data is periodically transmitted to the mobile device. The visual data may be raw data, compressed data, encoded data, encrypted data and/or any other format or arrangement of data. Preferably the data is wirelessly transmitted to the mobile device. In some embodiments, the data is transmitted over the same wireless means and/or channel as that which couples the mobile device with the apparatus 100. In other embodiments, the data is transmitted over the same wireless means but a different channel. In still other embodiments, the data is transferred over a different wireless means. In one example, the mobile device is coupled to the multipurpose apparatus 100 over Bluetooth. The data may be transmitted over the Bluetooth connection. In some embodiments, the data is transmitted over the same Bluetooth channels and in other embodiments, the data is transmitted over different channels. In another example, the data is transmitted over a wireless means different to Bluetooth, referred to herein also as a "secondary wireless means". One example of a secondary wireless means is NFC. Another example is WiFi. Many other examples exist. The secondary wireless means may simply be the employment of a different wireless protocol over the same antenna (e.g. hybrid Wi-Fi/Bluetooth chips use a single antenna with the chip making sure that neither one is on at the same time) or even a different transceiver and/or a different antenna. In preferred embodiments, the apparatus further includes GPS/satellite technology.

Embodiments from transmitting audio data and visual data have been discussed separately here. However, it is clarified that any details discussed for one of the functions applies equally, mutatis mutandis, to the other. Additional features were discussed above and will be discussed below. Again, any and, if applicable, all features discussed for one component are understood to apply to other components as well.

In further preferred embodiments, the apparatus additionally or alternatively includes at least one backwards-looking/interior facing camera 182. In some embodiments, such as the embodiment depicted in the Figures, the apparatus 100 further includes a second backwards-/interior-facing camera 184. Whether one or two cameras are included, either the individual camera or the two cameras together have a FOV of at least the interior space of the vehicle (or a comparable area, when placed in a different setting such as an office or interrogation room). In some embodiments, some of the surrounding environment is also captured by one or both of the cameras.

In one embodiment, the camera 182 or cameras 182, 184 are activated when the mobile device (e.g. smartphone 200) is connected to the apparatus 100. The cameras may be programmed (e.g. via the mobile app or as a default factory setting) to continuously capture video or periodically capture still images, or capture video at predetermined intervals for predetermined amounts of time. The versatility of the video capture feature is determined by the hardware, firmware and software (e.g. the mobile app software) based on the needs or desires of the manufacturers or users.

In one envisioned feature, a video package of the system includes software capable of recognizing that an individual is still in the car (e.g. a sleeping infant) while the mobile device is getting further and further away from the apparatus. It is an unfortunate fact that many young children have mistakenly been left in cars unattended. These mistakes are sometimes fatal. The present feature is able to detect that the mobile device is moving away from the apparatus (e.g. based on Received Signal Strength Indicator (RSSI) levels of the wireless signal between the mobile device and the apparatus) while the interior-facing camera is capturing footage of the sleeping infant left in the car. In such situations, an image processor identifies the person-like figure in the car, the processor unit determines that the mobile device is moving away from the car and the processor unit sends an emergency notification or message to the mobile device that a child is still in the car. If the apparatus is equipped with cellular communication capabilities then the message can be sent over the cellular network to predefined numbers (e.g. a second parent, police, fire and rescue services etc.). If the apparatus is equipped with GPS capabilities, then an exact location of the vehicle can be sent to rescue services. Otherwise, the approximate location of the vehicle can be calculated using cellular triangulation. Exemplarily, the massage may be a text message or an audio message that informs the parent/rescue services of the situation.

In other embodiments the camera/s is/are activated upon detection of motion within the FOV of the camera/s. In such an embodiment, the cameras have two modes, exemplarily referred to as a passive mode and an active mode. In the first mode, termed herein as the "passive mode", the cameras are in motion detection mode. Motion detection demands relatively low power consumption relative to active capture of images/video. Once motion is detected, the camera switches to the active mode, for at least a predetermined amount of time (e.g. 15 seconds) or until movement is no longer detected (even during active capture mode, the control unit of the apparatus is able to determine whether there is motion within the captured FOV). In such an embodiment, the apparatus includes either a large capacity storage medium or a wireless network transmission means (e.g. cellular antenna/transceiver, SIM card etc.) or both.

In some embodiments, either motion detection or mobile connectivity active video capture. Preferably, in all configurations discussed above where visual data is captured and stored, the visual data that is stored on the storage medium/media is periodically transmitted to the mobile device as discussed above. Alternatively or additionally, the visual data may be uploaded to the cloud/storage server from either the mobile device or the apparatus 100 itself, where applicable.

In some embodiments, apparatus 100 includes a wireless earpiece that is battery operated, communicates with apparatus 100 or directly with mobile device 200 over a radio frequency (RF) protocol. In embodiments, the earpiece 160 includes an ear bud 162 and a microphone 164 for two-way communication. The battery is a rechargeable battery and is housed in a cradle 166 that include a charging/docking port (not seen) for recharging the battery when not in use. A user not wanting to broadcast the incoming audio transmission over speaker 130 can activate earpiece 160 by either simply removing it from cradle 166 or by pressing an optional button 168 (see FIG. 2) to connect the device to the apparatus or mobile device as preconfigured or selected on the mobile app installed in the mobile device.

In all embodiments, the apparatus includes a power source. In preferred embodiments the power source is a battery 190. In some embodiments, the power source is a power port with a wired connector with an adaptor for a cigarette lighter (or a plug for a power outlet), channeling power from the vehicle or electricity grid to the apparatus 100. However, in preferred embodiments the battery is a rechargeable battery that is configured to provide power both when plugged in to a power source (e.g. cigarette lighter in a vehicle and power outlet in a room) and/or when holding a charge.

In preferred embodiments, the battery has power intake port (e.g. DC IN, micro USB port) 192 (see FIG. 4). In embodiments, the battery includes a power outlet port (e.g. DC OUT, USB port) 194. Exemplarily, outlet port 194 can be used to power mobile device 200 or any other type of mobile device capable of drawing power over a wired connection such as a USB cable. In embodiments, the intake and/or outlet ports can be used as data ports for facilitating a wired connection, e.g. between mobile device 200 and multipurpose apparatus 100.

In embodiments, battery 190 is detachable, e.g. by releasing latches 196. Exemplarily, datable battery conducts energy to the apparatus via contacts 198 (e.g. gold plated contacts). The detachable battery can either be charged via a cord connected to the cigarette lighter or detached and charge in the house, using a regular phone charger. The latter option is very useful as a cigarette lighter only draws power (in most vehicles, that is) when the vehicle is on. With a detachable battery, the battery can be charged overnight to ensure full strength and long use without needing to plug the device into the cigarette lighter.

Some of the media components (any and all of the microphone, speaker, cameras, earpiece, storage media, ports, battery) discussed above are depicted in the Figures as peripheral devices. As mentioned above, it is made clear that the placement, configuration and form in which the components are depicted are merely exemplary and the result of an arbitrary design choice. As such, the arrangement, form, configuration and the components themselves are in no way limiting to the scope of the invention.

For example, the support structure could be a dashboard-mounted stand with a rectangular housing rotatably coupled to the stand (not shown). The coupling mechanism may be a magnet that mates with a metal piece fixed to the back of the mobile device. The housing may be wider than the standard width of a mobile device (e.g. iPhone™, Galaxy S3™ etc.). Interior-facing cameras may be button-hole cameras integrated into the rectangular housing. The exterior-facing camera may be a fish-eye camera integrated into the exterior facing side of the housing. A microphone and speaker may be integrally housed in the housing. The housing may have an indentation or opening for holding a removable earpiece. The battery, ports, media slots may all be formed integrally within the rectangular housing. The purpose of the foregoing description of another configuration of the smart holder of the immediate invention is merely intended to illustrate that the aesthetic form and configuration of the invention is not limited to the depicted embodiment but rather can come in any applicable form, configuration and combination of components discussed above.

Another possible configuration includes a support structure, a processing unit, a wireless communications module, a storage medium and a forward looking camera. All the components function as detailed above. For example, the stored data is temporarily stored on the storage medium and periodically transmitted to the mobile device. Alternatively the stored data is transmitted over a wireless network to a remote storage device.

Yet another configuration includes a support structure, a processing unit, a wireless communications module, a storage medium and at least one interior-looking camera. As detailed above, the first interior-looking camera is operationally coupled to the support structure and electronically coupled to the processor unit. The first interior-looking camera adapted to be positioned so as to have a field of view of at least a portion of an interior space of a vehicle or other space such as a room, when fixed in place in that interior space. First interior-looking camera is operationally coupled to the storage medium and processor unit and is configured to record and store visual input sensed by the first interior-looking camera on the storage medium.

In yet another configuration, the apparatus includes a support structure, a processor unit, a storage medium and at least one media sensor (microphone or camera) capable of sensing noise, movement or both. Further, the media sensor is to capable of capturing audio, visual or audiovisual matter and storing that matter as data on the storage device(s). The media sensor is configured to activate upon sensing motion within the field of view of the device or sensing noise above a predefined volume threshold. Activation (i.e. in an active state) includes capturing data, storing data and wireless transmitting the data (either to the mobile device or over a wireless communications network).

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An apparatus for a mobile device, the apparatus comprising:
   a support structure including a mounting apparatus, adapted for fixing the apparatus in place within an interior space, a coupling mechanism adapted for removeably coupling the mobile device to said support structure, and a control unit housing;
   a processor unit, housed in said housing;
   a wireless transceiver, operationally coupled to said processor unit and configured to communicate with the mobile device; and
   a Subscriber Identity Module (SIM) slot or a mini-SIM slot.

2. The apparatus of claim 1, further comprising:
   a microphone, operationally coupled to said processor unit; and
   a storage medium, said storage medium operationally coupled to said microphone, said processor configured to record and store as audio data, on said storage medium, audio input sensed by said microphone.

3. The apparatus of claim 1, further comprising:
   a forward-looking camera, said forward-looking camera operationally coupled to said support structure and electronically coupled to said processor unit; said forward-looking camera adapted to be positioned so as to have a field of view through a windshield of a vehicle; and
   a storage medium, said storage medium operationally coupled to said forward-looking camera, said processor unit configured to record and store as visual data, on said storage medium, visual input sensed by said forward-looking camera.

4. The apparatus of claim 1, further comprising:
a first interior-looking camera operationally coupled to said support structure and electronically coupled to said processor unit; said first interior-looking camera adapted to be positioned so as to have a field of view of at least a portion of said interior space of said vehicle, when fixed in place in said interior space; and
a storage medium, operationally coupled to said first interior-looking camera, said processor configured to record and store visual input sensed by said first interior-looking camera on said storage medium.

5. The apparatus of claim 4, further comprising:
a second interior-looking camera operationally coupled to said support structure and electronically coupled to said processor unit; said second interior-looking camera adapted to be positioned so as to have a field of view of a second portion of said interior space of said vehicle, when fixed in place in said interior space; and
wherein said processor is configured to record and store visual input sensed by said second interior-looking camera on said storage medium.

6. The apparatus of claim 1, further comprising:
an earpiece; and
an earpiece receptacle, operationally coupled to said support structure and configured to hold said earpiece.

7. The apparatus of claim 6, wherein said earpiece receptacle further includes a power port and said earpiece is adapted to receive power via said power port.

8. The apparatus of claim 6, wherein said earpiece is capable of wireless communication.

9. The apparatus of claim 6, wherein said earpiece is operationally coupled to the apparatus via a wired electrical connector.

10. The apparatus of claim 1, further comprising:
a rechargeable battery operationally coupled to said processing unit, said rechargeable battery including a power intake port for operationally coupling said rechargeable battery to a power source.

11. The apparatus of claim 10, wherein said rechargeable battery further includes a power outlet port.

12. The apparatus of claim 10, wherein said rechargeable battery is detachably coupled to the apparatus.

13. The apparatus of claim 1, further comprising a memory card slot.

14. The apparatus of claim 1, further comprising:
a wireless network transceiver operationally coupled to said processor unit, wherein said processor unit is configured to connect said wireless network transceiver to a SIM card inserted in said SIM slot or said mini-SIM slot so as to effect wireless transmission of audio, visual or audio-visual data over a cellular network or a satellite network.

15. The apparatus of claim 4, wherein said processing unit is configured to effect wireless transmission of audio, visual or audio-visual data from said storage medium to the mobile device.

16. An apparatus for a mobile device, the apparatus comprising:
a support structure including a mounting apparatus, adapted for fixing the apparatus in place within an interior space of a vehicle, a coupling mechanism adapted for removeably coupling the mobile device to said support structure, and a control unit housing, said control unit housing including:
a processor unit, and
a wireless transceiver, operationally coupled to said processor unit and configured to communicate with the mobile device;
a forward-looking camera, said forward-looking camera integrated with, and fixedly mounted on, said support structure and electronically coupled to said processor unit; said forward-looking camera adapted to be positioned so as to have a field of view through a windshield of said vehicle; and
a storage medium, said storage medium operationally coupled to said forward-looking camera, said processor unit configured to record and store on said storage medium visual input sensed by said forward-looking camera as visual data.

17. The apparatus of claim 16, wherein said processing unit is configured to effect wireless transmission of said visual data from said storage medium to the mobile device.

18. An apparatus for a mobile device, the apparatus comprising:
a support structure including a mounting apparatus, adapted for fixing the apparatus in place within an interior space, a coupling mechanism adapted for removeably coupling the mobile device to said support structure, and a control unit housing, said housing including:
a processor unit, and
a wireless transceiver, operationally coupled to said processor unit and configured to communicate with the mobile device;
a first interior-looking camera integrated with said support structure and electronically coupled to said processor unit; said first interior-looking camera adapted to be positioned so as to have a field of view of at least a portion of said interior space, when fixed in place in said interior space; and
a storage medium, operationally coupled to said first interior-looking camera, said processor configured to record and store visual input sensed by said first interior-looking camera on said storage medium.

19. An apparatus for a mobile device, the apparatus comprising:
a support structure including a mounting apparatus, adapted for fixing the apparatus in place within an interior space, a coupling mechanism adapted for removeably coupling the mobile device to said support structure, and a control unit housing;
a processor unit;
at least one media sensor integrated into said support structure and electronically coupled to said processor unit, said at least one media sensor configured to activate upon sensing motion within a field of view or noise above a predefined volume threshold of said at least one media sensor; and
a storage medium, operationally coupled to said at least one media sensor, said processor configured to record and store visual, audio or audiovisual input, sensed by said at least one media sensor, on said storage medium; and
a rechargeable battery operationally coupled to said support structure and adapted to power the apparatus when disengaged from a power source.

20. The apparatus of claim 19, further comprising:
a wireless network transceiver operationally couple to said processor unit, wherein said processor unit is configured to connect said wireless network transceiver to a SIM card so as to effect wireless transmission of said stored audio, visual or audiovisual input over a cellular network or a satellite network.

21. The apparatus of claim 19, wherein said at least one media sensor is selected from the group including: an image detector, a video camera, a microphone, a combination audiovisual sensor.

22. The apparatus of claim 21, wherein said at least one media sensor includes a plurality of media sensors.

\* \* \* \* \*